Nov. 25, 1969 N. K. ARTER ET AL 3,480,827

FLYBACK IN DOUBLE-YOKE-DRIVE CATHODE RAY TUBES

Filed Jan. 14, 1969

INVENTORS
N. K. ARTER
V. C. MARTIN

BY Homer L. Kneaul

AGENT

United States Patent Office 3,480,827
Patented Nov. 25, 1969

3,480,827
FLYBACK IN DOUBLE-YOKE-DRIVE CATHODE RAY TUBES

Nelson K. Arter, Lafayette, and Van C. Martin, Boulder, Colo., assignors to International Business Machines Corporation, Armonk, N.Y., a corporation of New York Filed Jan. 14, 1969, Ser. No. 791,051
Int. Cl. H01j 29/70
U.S. Cl. 315—27 8 Claims

ABSTRACT OF THE DISCLOSURE

Cathode ray tubes, which have a double-yoke drive in each dimension, inherently contain a flyback problem. In double-yoke drive, one yoke is used as a reference bias, which remains unchanged, while the other yoke contains the normal ramp signal with a flyback signal. During the flyback, the field in the ramp yoke rapidly decreases, which induces a large voltage in the bias yoke via a transformer type action. As a result, this large voltage pulse in the bias yoke can saturate the bias driver circuits. This problem is alleviated herein by use of an additional driver circuit interconnecting the ramp driver and the bias driver, whereby the voltage spike produced on the ramp yoke is passed through circuitry to drive the bias yoke in a direction to compensate for the pulse being induced in the bias yoke. In addition, the interconnecting pedestal driver contains noise thresholding circuitry so as to prevent small noise pulses from initiating operation of the pedestal driver, and, thus, distorting the bias on the bias yoke.

BACKGROUND OF THE INVENTION

This invention relates to an improved circuit for increasing flyback speed in double-yoke drive cathode ray tubes. More particularly, the invention relates to a pedestal driver circuit interconnecting the ramp yoke and the bias yoke, whereby high voltage pulses on the bias yoke are compensated.

Cathode ray tubes having a double-yoke driver in each dimension are normally used in scientific application of cathode ray tubes where a high degree of accuracy of position of the cathode ray beam is required. In the double-yoke configuration, one yoke is driven by a DC level to give a reference position to the cathode ray beam. The other yoke is driven by a ramp signal which has two slopes. The positive slope has a gentle rise and is used for sweeping the beam from the reference position, while the falling slope has a very steep gradient, whereby the beam will rapidly fly back to the reference position.

The problem arises in that the two yokes also act like a transformer. Accordingly, during the steep gradient, or flyback, the pulse produced in the ramp yoke, which accomplishes the flyback, is also produced in the bias yoke because of the transformer action. The induced voltage pulse on the bias yoke is opposite in direction to the normal biasing of the yoke. As a result, the drive circuit for the bias yoke is driven into saturation. Also, unless some care is used in protecting the transistors used in the bias driver, this reverse saturation may actually burn out the transistors. However, saturation alone will destroy the practical utility of the bias driver because the driver cannot come out of saturation fast enough to be ready for the next deflection cycle of the cathode ray beam. In other words, if the bias driver is driven into saturation during flyback, the driver does not respond rapidly enough to be back to a reference bias by the time the ramp voltage is being applied to the ramp yoke.

Of course, one solution to the problem is to clamp the voltage across the ramp yoke so as to prevent the generation of the voltage pulse during flyback. This is not satisfactory because clamping the voltage pulse during flyback lengthens the time required for flyback beyond the point of practicality.

Another solution is to use high-power transistors for the drive circuits and operate the whole system at a much higher voltage. In effect the transistors in the drive circuit must be able to operate over a range of approximately 100 volts. This is not satisfactory because in ramp configuration a great amount of voltage and current is being used by the transistors so that the power being consumed is in the order of hundreds of watts. This makes for very inefficient operation and requires elaborate cooling systems to keep this system from destroying itself.

It is an object of this invention to permit fast flyback of the cathode ray beam and at the same time prevent the drive circuits from being saturated by the flyback induced voltage pulse.

It is another object of this invention to operate a double-yoke cathode ray tube system, wherein the bias driver is kept out of reverse saturation during flyback.

SUMMARY OF THE INVENTION

In accordance with this invention, the above objects are accomplished by addition of a pedestal driver circuit to the double-yoke drive system, wherein the pedestal driver senses the rise in voltage on the ramp yoke and drives the voltage on the bias yoke to a much higher level so as to cancel out the effect of induced voltage on the bias yoke. In addition to the pedestal driver, performance may also be enhanced by clamping the voltage pulses on the ramp yoke at a high level, which aids the pedestal driving operation and does not appreciably slow down the flyback speed. In other words, the voltage pulse induced during flyback is allowed to go to a high level, but not so high as to overload the pedestal-driver circuit. In addition, the invention may also be further enhanced by providing a threshold circuit in the pedestal driver so that the pedestal driver is not activated until the signal induced at the ramp yoke exceeds a given level. This makes the pedestal driver less susceptible to being initiated by noise. The pedestal driver may also be further improved in operation by insertion of RC circuits to round off transients and prevent any ringing during switching of the pedestal driver.

The great advantage of this invention is that it permits extremely high flyback speeds in double-yoke cathode ray tube systems without the use of high-power circuitry. There is no need for the high-power transistors or large voltages sources, as used in previous solutions to the problem. The components here do not overheat and, in general, are low wattage components which lend themselves to implementation on low-power printed circuits.

The foregoing and other objects, features and advantages of the invention will be apparent from the following more particular description of a preferred embodiment of the invention, as illustrated in the accompanying drawings.

BRIEF DESCRIPTION OF DRAWINGS

FIGURE 2B indicates voltages appearing at the ramp yoke. FIGURE 2C indicates voltages appearing at the bias yoke.

STRUCTURAL DESCRIPTION

Figure 1:
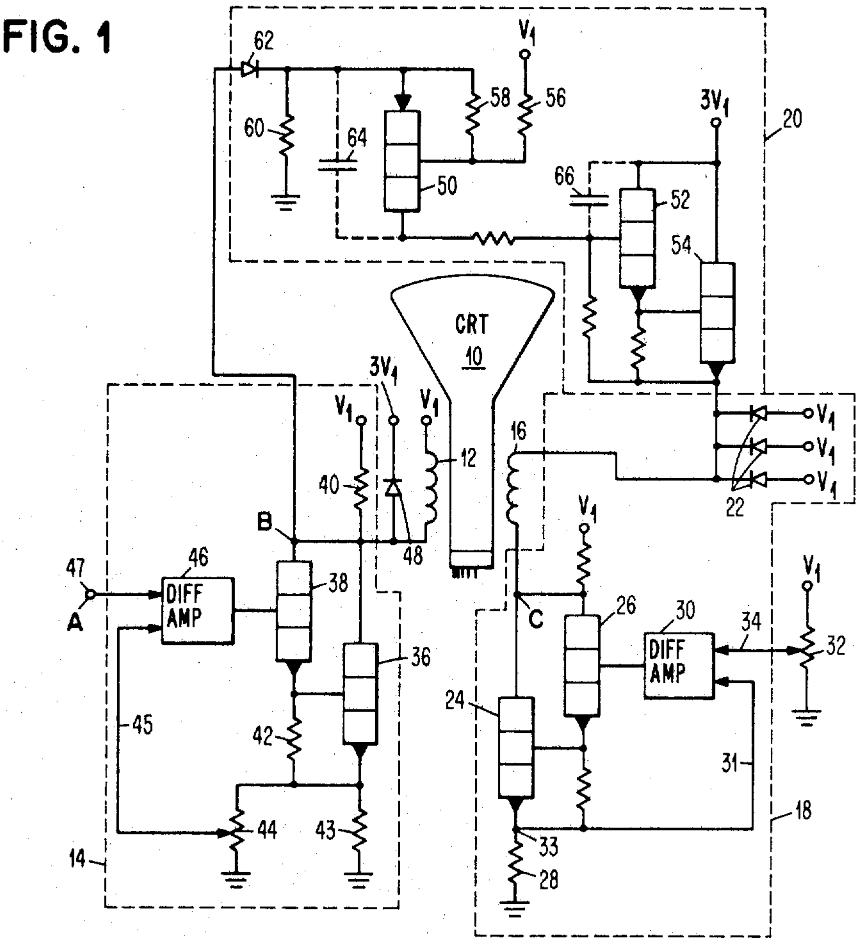
FIGURE 1 shows a circuit schematic of a preferred embodiment of the invention, wherein the double-yoke drive for one dimension of a cathode ray tube is controlled by a ramp driver, a bias driver, and by a pedestal driver interconnecting the two yoke drivers.

In FIGURE 1 cathode ray tube 10 is shown with one set of double yokes. Yoke 12 is the ramp yoke—driven by the ramp driver 14, while the bias yoke 16 is driven by the bias driver 18. Interconnecting the ramp driver and the bias driver is the pedestal driver 20 which acts on the bias driver 18 to counteract the flyback pulses induced in bias yoke 16.

Referring now to the bias driver, positive voltage $V_1$ is applied through diodes 22 to the top of bias yoke 16. The bottom of the bias yoke 16 is connected to the collectors of transistors 24 and 26. Transistors 24 and 26 form a Darlington circuit which controls the current through the bias yoke 16. Resistor 28 connected to the emitter of transistor 24 is a very low-value, high-precision resistor used to detect and control the current through yoke 16.

The yoke current passes through resistor 28 and generates a voltage which is fed back to the difference amplifier 30 via line 31. The other input to the difference amplifier 30 is from potentiometer 32. Potentiometer 32 is driven by reference bias and may be adjusted to provide a reference level into the difference amplifier. The feedback loop operates in conjunction with the difference amplifier 30 to insure that the voltage at point 33 is identical to the voltage applied to the difference amplifier over line 34 from the potentiometer 32. By adjusting the potentiometer 32, the voltage at point 33 may be controlled and in turn, this controls the current through yoke 16.

The ramp-yoke driver 14 also consists of a Darlington circuit with a feedback loop to a difference amplifier. The ramp yoke 12 is connected to the collectors of transistors 36 and 38, which form the Darlington configuration. Resistors 40, 42, and 43 provide the normal bias for operation of the Darlington configuration. Potentiometer 44 has a much higher resistance than resistor 43 and merely acts to sample the voltage at the emitter of transistor 36. The potentiometer is adjusted to provide feedback via line 45 to the difference amplifier 46. The amount of signal fed back to the difference amplifier 46 controls the amplitude of the ramp-current signal through ramp yoke 12. The ramp signal is applied to the difference amplifier 46 over the line 47.

Diode 48, adjacent to the ramp yoke 12, is not a part of the ramp-yoke driver. Instead, diode 48, with the voltage $3V_1$ applied thereto, acts as a voltage clamp. The clamp prevents large voltage pulses induced in yoke 12 from driving pedestal driver 20 into saturation.

Pedestal driver 20 is made up of two stages. The first stage, centered about transistor 50, operates as a noise thresholding circuit, while the second stage, consisting of transistors 52 and 54 in the Darlington configuration, operates as a voltage switch to apply the $3V_1$ voltage to the top of the bias yoke 16, when transistors 52 and 54 are conducting.

With regard to the first stage operating around transistor 50, resistors 56, 58, and 60 operate as voltage dividers to bias the transistor 50 and the diode 62. While the ramp voltage is being applied to the ramp yoke 12, diode 62 will be back-biased, and transistor 50 will be cut off. At the start of flyback, the rapid rise in voltage across the ramp yoke 12 will cause diode 62 to become forward biased, and shortly thereafter, transistor 50 will be turned on.

When transistor 50 is turned on, the second stage, made up of transistors 52 and 54, is turned on because of the current supplied to their bases by transistor 50. Transistor 54 is turned on harder and harder as the induced signal from ramp yoke 12 turns on transistor 50. Eventually, the induced voltage from ramp yoke 12 is clamped to $3V_1$, and at this point transistor 54 is essentially saturated and is also applying the $3V_1$ voltage to the top of the bias yoke 16. In summary, during flyback the pulse of voltage generated in ramp yoke 12 is induced in the opposite direction in bias yoke 16. The induced pulse in yoke 16 is balanced out by the pedestal driver 20 pulling up the voltage applied to yoke 16 in a direction opposite to the induced pulse.

The capacitors 64 and 66, shown in the pedestal driver 20, are not necessary for the operation of the pedestal driver. However, they do increase its speed of reaction and tend to round off the waveform applied to the top of the bias yoke 16 so that it more nearly matches the induced voltage pulse in yoke 16. Capacitor 64 passes the rising transient, when the induced pulse is just beginning and rapidly turns on transistors 52 and 54 before transistor 50 turns on to drive transistors 52 and 54. Capacitor 66, on the other hand, controls the decay of voltage at the bases of transistors 52 and 54, when the flyback pulse is dying out. The action of these capacitors will be more clearly understood when the operation of the invention is described with reference to FIGURE 2 waveforms.

OPERATION

Figure 2:
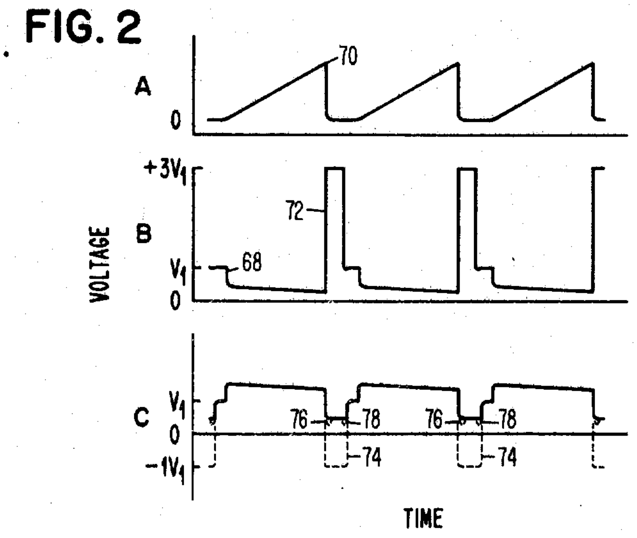
FIGURES 2A, 2B, and 2C show waveforms which are present at different points in the circuit of FIGURE 1. The waveform in 2A is the ramp voltage which is applied to the ramp driver.

In FIGURE 2, three waveforms are shown and identified as A, B, and C. These waveforms are the signals present at points A, B, and C, in FIGURE 1.

Initially, the bias yoke 16 has a given amount of current driven through by adjustment of potentiometer 32. This adjustment of potentiometer 32 fixes the reference point for the cathode ray beam in the dimension controlled by the double yokes 12 and 16. Deflection in that dimension is controlled by application of waveform A to line 47. The amplitude of the deflection can be controlled by adjusting potentiometer 44.

While the ramp waveform A is gradually rising, the cathode ray beam is deflected from its reference position. During this part of the cycle the pedestal driver is inoperative since diode 62 is back-biased. The threshold at which transistor 50 is forward biased, is shown as the level TH in waveform B of FIGURE 2. Waveform B appears at the collectors of the Darlington stage in the ramp driver 14.

At the quiescent point, before initiation of the ramp, diode 62 is forward biased, but the transistors 50, 52 and 54 in pedestal driver 20 are not conductive in this quiescent state. When the ramp begins to rise at the input to the difference amplifier 46, the current through yoke 12 begins to rise as a ramp signal. This linear rise in current through yoke 12 is differentiated by the yoke 12 to produce a constant voltage drop at point B. This is shown as the drop in voltage along portion 68 of waveform B. If there were no resistance in the yoke 12, the voltage at the bottom of the 68 portion of waveform B would remain constant until flyback; however, because of resistance in the yoke 12, there is a gradual further voltage drop as the current through yoke 12 increases.

At point 70 of waveform voltage A, flyback is initiated, and the current supplied to yoke 12 is rapidly dropped. The collapsing magnetic field in yoke 12 generates the voltage pulse 72 in waveform B. The pulse 72 is clipped at the $3V_1$ level by diode 48. Clipping this pulse at the high level of $3V_1$ does not appreciably slow down the flyback of the cathode ray beam. When the pulse dies out, the voltage at point B returns to quiescent level of $V_1$ voltage, indicating there is no current through the ramp yoke 12.

If the pedestal driver were not present, then a negative pulse of the same size would appear at point C in the bias driver 18. This pulse is due to the 1 to 1 transformer action of yoke 12 with yoke 16. The negative pulse is shown in dash lines as portions 74 of waveform C.

The pedestal driver action is initiated by the rising edge of the pulse 72, which forward biases diode 62 and transistor 50, and turns on transistors 52 and 54. With transistor 54 being turned on by the rise in pulse 72, voltage through transistor 54 raises the voltage applied to the yoke 16 at the same rate that the induced voltage is causing the voltage at point C to drop. The voltage at point C drops slightly below $V_1$ because the noise threshold in the pedestal drive 20 prevents transistor 54 from turning on until after the threshold is exceeded. When the voltage pulse 72 begins to decay away, transistor 54 is gradually turned off, and the voltage at point C returns to $V_1$. When the ramp is again initiated, voltage waveform C shows an immediate rise in voltage which is the induced voltage corresponding to the drop voltage 68 (waveform B) occurring in yoke 12. The waveform C also shows the same gradual drop in voltage due to resistance as occurred in yoke 12.

The capacitor 64 is used to bypass the transistor 50 during the initial use of the voltage pulse 72. If capacitor 54 is not used, the circuit is operative, but a small voltage spike will appear at portions 76 of waveform C.

The capacitor 66 in the pedestal driver is used to control the decay of the voltage applied to transistors 52 and 54 when the voltage pulse 72 is dying out. Without capacitor 66 a small voltage spike 78 will occur in waveform C.

This invention has been described, utilizing low-power components on the order of one-watt devices with about 15 volts for $V_1$ voltage source and 45 volts for the $3V_1$ voltage source. Of course, other values of voltage sources could be used with commensurate adjustment of components, as is well known in the art.

While the invention has been particularly shown and described with reference to a preferred embodiment thereof, it will be understood by those skilled in the art that various changes in form and details may be made therein without departing from the spirit and scope of the invention.

What is claimed is:

1. In a cathode ray tube having a bias yoke and a ramp yoke for a given direction of deflection, apparatus for improving beam flyback speed and control in the given direction comprising:

ramp means for driving the ramp yoke of the cathode ray tube;
bias means for driving the bias yoke of the cathode ray tube;
means for sensing increased voltage at the ramp yoke during beam flyback;
compensating means responsive to said sensing means for compensating the bias yoke with a high voltage during beam flyback so that the voltage induced across the bias yoke during flyback is balanced out at said bias means by the voltage from said compensating means.

2. The apparatus of claim 1 further comprising:

threshold means for inhibiting said sensing means from sensing the increased voltage at the ramp yoke until the increased voltage exceeds a predetermined threshold.

3. The apparatus of claim 1 further comprising:

means for clipping the increased voltage at the ramp yoke when it reaches a high level so that said sensing means and said compensating means are protected from high level voltages without substantially decreasing the flyback speed of the cathode ray beam.

4. In a cathode ray tube having a bias yoke and a ramp yoke for a given direction of deflection, apparatus for improving beam flyback speed and control in the given direction comprising:

ramp means for driving the ramp yoke of the cathode ray tube;
bias means for driving the bias yoke of the cathode ray tube;
first electronic valve means for applying a balancing signal to said bias yoke;
second electronic valve means responsive to increased voltage at the ramp yoke during beam flyback for supplying a signal to the valve of said first electronic valve means so that as the increased voltage at the ramp yoke rises and falls said first electronic valve means is driven harder and then easier, respectively;
said first electronic valve means responsive to said second electronic valve means for applying the balancing signal to said bias yoke harder and easier as the increased voltage at the ramp yoke rises and falls, respectively, during flyback so that the voltage induced across the bias yoke during flyback is balanced out at said bias means.

5. The apparatus of claim 4 further comprising:

threshold bias means for biasing the valve of said second electronic valve means to a predetermined threshold so that said second electronic valve means supplies a signal to the valve of said first electronic valve means only while the increased voltage at the ramp yoke is above the predetermined threshold.

6. The apparatus of claim 4 further comprising:

unilateral conducting means biased at a high voltage and connected to the ramp yoke for conducting excess energy released from the ramp yoke during flyback away from said second electronic valve means when the increased voltage at the ramp yoke exceeds the high voltage bias on said unilateral conducting means.

7. The apparatus of claim 4 further comprising:

capacitive bypass means for bypassing a transient signal around said second electronic valve means to the valve of said first electronic valve means during the rising edge of increased voltage at the ramp yoke so that said first electronic valve means applies the balancing signal rapidly to the bias yoke.

8. The apparatus of claim 4 further comprising:

capacitive bias means connected to the valve of said first electronic valve means for controlling the trailing edge of the signal applied to the valve of said first electronic valve means so that ringing is eliminated from the balancing signal applied to the bias yoke.

References Cited

UNITED STATES PATENTS 3,424,942 1/1969 Barbin ---------------- 315—27

OTHER REFERENCES

IBM Technical Disclosure, vol. 10, No. 10, March 1968, p. 1495.

RODNEY D. BENNETT, Primary Examiner

JOSEPH G. BAXTER, Assistant Examiner

U.S. Cl. X.R.

315—18; 340—324.1